United States Patent Office 3,326,613
Patented June 20, 1967

3,326,613
ANTIFRICTION BEARING, ESPECIALLY FOR JOURNALLING SPINDLES
Hansjörg Renker, Schaffhausen, Switzerland, assignor to George Fischer Aktiengesellschaft, Schaffhausen, Switzerland
Filed Aug. 7, 1964, Ser. No. 388,230
Claims priority, application Switzerland, Aug. 16, 1963, 10,234/63
5 Claims. (Cl. 308—189)

The present invention relates to the journalling of a spindle in an antifriction bearing with spacer rings or bushings interposed between the two outer and inner race rings of the said bearing and arranged in pairs and in an opposite sense with regard to each other. Every anti-friction bearing has to be adjusted in conformity with the play corresponding to the respective speed of rotation. Low speeds of rotation generally require a narrow play and high speeds of rotation require a wide play. With high speeds of rotation, heat is produced along the roller lines which heat is conveyed away primarily through the bearing rings. If the heat flow is effected in the direction of the bearing outer rings, a relatively good heat transfer is obtained because large masses of material are present and the heat transfer is effected over large surfaces to the outer medium. A heat transfer through the inner bearing rings is less favorable because small masses of material are present and smaller heat transfer surfaces are available.

Various attempts have been made to take into consideration the said non-uniform heat flow. Thus, a two-row ball bearing has become known in which instead of the two ordinary race ring pairs with a circular race each, only one ordinary race ring each is employed while as counter piece there is employed a race ring with a conical surface race ring. Depending on whether the greater heat development occurs on the inner or outer race rings, the arrangement of the last mentioned type makes it possible to install the conical surface race ring on the inner or the outer side and thus to take into consideration the non-uniform expansion due to the heat development whereby the bearing play can be maintained. Furthermore, constructions have become known in which one of the axial spacer bushings has been designed as a spring member.

It is an object of the present invention to provide an antifriction bearing, especially for the journalling of a spindle, which has a temperature-controlled play compensation.

It is another object of this invention to provide an antifriction bearing as set forth in the preceding paragraph, which will make it possible in a simple way to compensate for the non-uniform heat flow and the heat expansion inherent thereto.

These and other objects and advantages of the invention will appear more clearly from the following specification in connection with the accompanying drawing, in which.

The antifriction bearing structure according to the present invention which comprises outer race rings and inner race rings and spacer ring means therebetween is characterized primarily in that the spacer ring means respectively arranged between the two antifriction bearing outer race rings and between the inner race rings consist of materials with different heat expansion coefficients.

Figure 1:
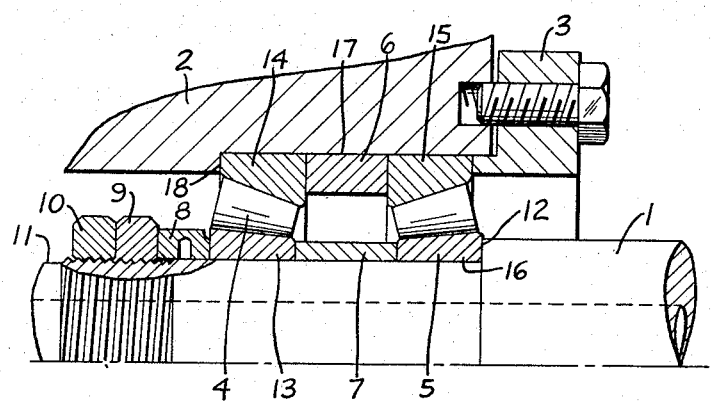
FIG. 1 is a partial longitudinal section through an antifriction bearing according to the present invention in connection with the journalling of a spindle.

Referring now to the drawing and FIG. 1 thereof in particular, the arrangement shown therein comprises a shaft 1 which may be designed as a hollow shaft and which is journalled in conical roller bearings 4 and 5 arranged in pairs and in an opposite sense with regard to each other. The bearing structure furthermore comprises outer race rings 14 and 15 spaced from each other by a spacer ring 6. Said race rings 14 and 15 and spacer ring 6 are mounted in a bore 17 of a bearing housing 2 of which a portion only has been shown, and are axially held in said bore by means of a ring 3 which may be connected to housing 2 in any convenient manner, for instance by screws. The two inner race rings 13 and 16 are spaced from each other by a spacer ring 7 which latter together with said inner race rings 13 and 16 is mounted on shaft 1 while inner race ring 16 abuts a shoulder 12 on shaft 1. The said race rings 13 and 16 and the spacer ring 7 are secured against axial displacement by means of a spring ring 8, a nut 9 threadedly engaging a thread 11 on shaft 1 and by a counter nut 10.

In order to be able when heat development occurs to maintain the bearing play which was ascertained during the installation of the bearing structure, the spacer member or spacer rings 6 and 7 consist, in conformity with the present invention, of materials having different heat expansion coefficients. More specifically, at that section or area where the greater heat development occurs, for instance steel or a nickel-steel alloy is employed, whereas at the other section or area where the lower heat development occurs, for instance bronze is employed for the respective spacer ring.

Figure 2:
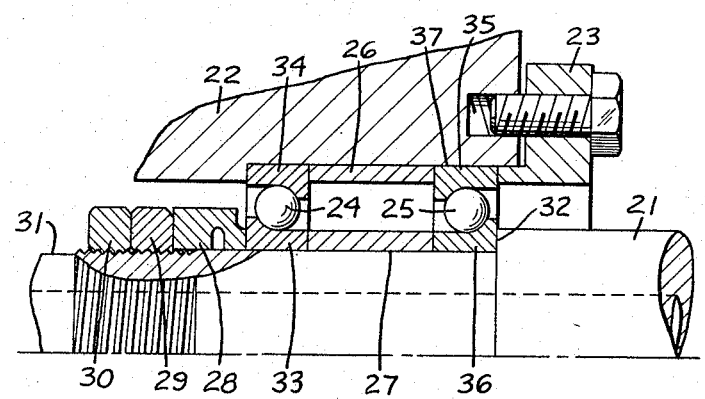
FIG. 2 represents a section similar to that of FIG. 1 through a modified bearing according to the present invention.

According to a further embodiment of the invention illustrated in FIG. 2, spacer rings of different materials with different heat expansion coefficients, for instance on one hand steel or a nickel-steel alloy, and on the other hand for instance bronze are employed. At high speed, the bronze spacer ring expands on the shaft to a greater extent than the Inva ring (nickel-steel alloy ring) on the housing side so that the conical bearing inner race rings are displaced axially and correspondingly increase the play.

A bearing housing 22 of which a portion only has been shown is provided with a bore 37 having an abutment or shoulder surface 38. Arranged in said bore 37 are two outer race rings 34 and 35 and a spacer ring 26. The outer race rings 34 and 35 respectively pertaining to two oblique ball bearings 24 and 25 and the spacer ring 36 therebetween are held in said bore 37 by a holding ring 23 which is connected to the bearing housing 22 in any convenient manner, for instance by screws not shown in the drawing. Shaft 21 which could represent a hollow shaft and which is provided with a shoulder 32 and a thread 31 has mounted thereon two inner race rings 33 and 36 of the two oblique ball bearings 24 and 25 and a spacer ring 27 therebetween. These parts are secured against axial displacement by a spring ring 28, a nut 29 on thread 31 and a counter nut 30 likewise meshing with thread 31. The function of compensation of this bearing is the same as that described in connection with FIG. 1.

It is, of course, to be understood that the present invention is, by no means, limited to the particular constructions shown in the drawing but also comprises any modifications within the scope of the appended claims.

What I claim is:
1. In combination: supporting means, bearing means mounted on said supporting means, a spindle supported by said bearing means, said bearing means comprising a pair of antifriction bearings spaced from each other in axial direction of said spindle, each of said bearings having a first race ring engaging said supporting means and also having a second race ring engaging said spindle, rigid first spacer ring means interposed between and engaging said first race rings, rigid second spacer ring means inter- posed between and engaging said second race rings, and means respectively securing said first and second race rings on said supporting means and said spindle and rigidly abutting said race rings on the sides thereof opposite said spacer ring means, said first and second spacer ring means respectively consisting of substances of different coefficients of thermal expansion whereby the development of different degrees of heat in said support means and spindle which could modify the operating conditions of said bearing means because of different degrees of thermal expansion in the region of said support means and said spindle respectively can be compensated.

2. A structure according to claim 1, in which the spacer ring means located adjacent the area of higher heat development consists of steel.

3. A structure according to claim 1, in which the spacer ring means located adjacent the area of higher heat development consists of a nickel-steel alloy.

4. A structure according to claim 1, in which the spacer ring means located adjacent the area of lower heat development consists of bronze.

5. A structure according to claim 1, in which the spacer ring means located adjacent the area of lower heat development consists of a bronze-alloy.

References Cited

UNITED STATES PATENTS 1,399,959   12/1921   Hanson _____ 74—5

FOREIGN PATENTS 448,028   4/1948   Canada.
938,343   1/1956   Germany.

MARTIN P. SCHWADRON, Primary Examiner.

FRANK SUSKO, Examiner.